Aug. 25, 1942.    F. P. KRUSE    2,293,745
MICROMETER MEANS FOR POSITIONING MACHINE ELEMENTS
Original Filed Oct. 31, 1938
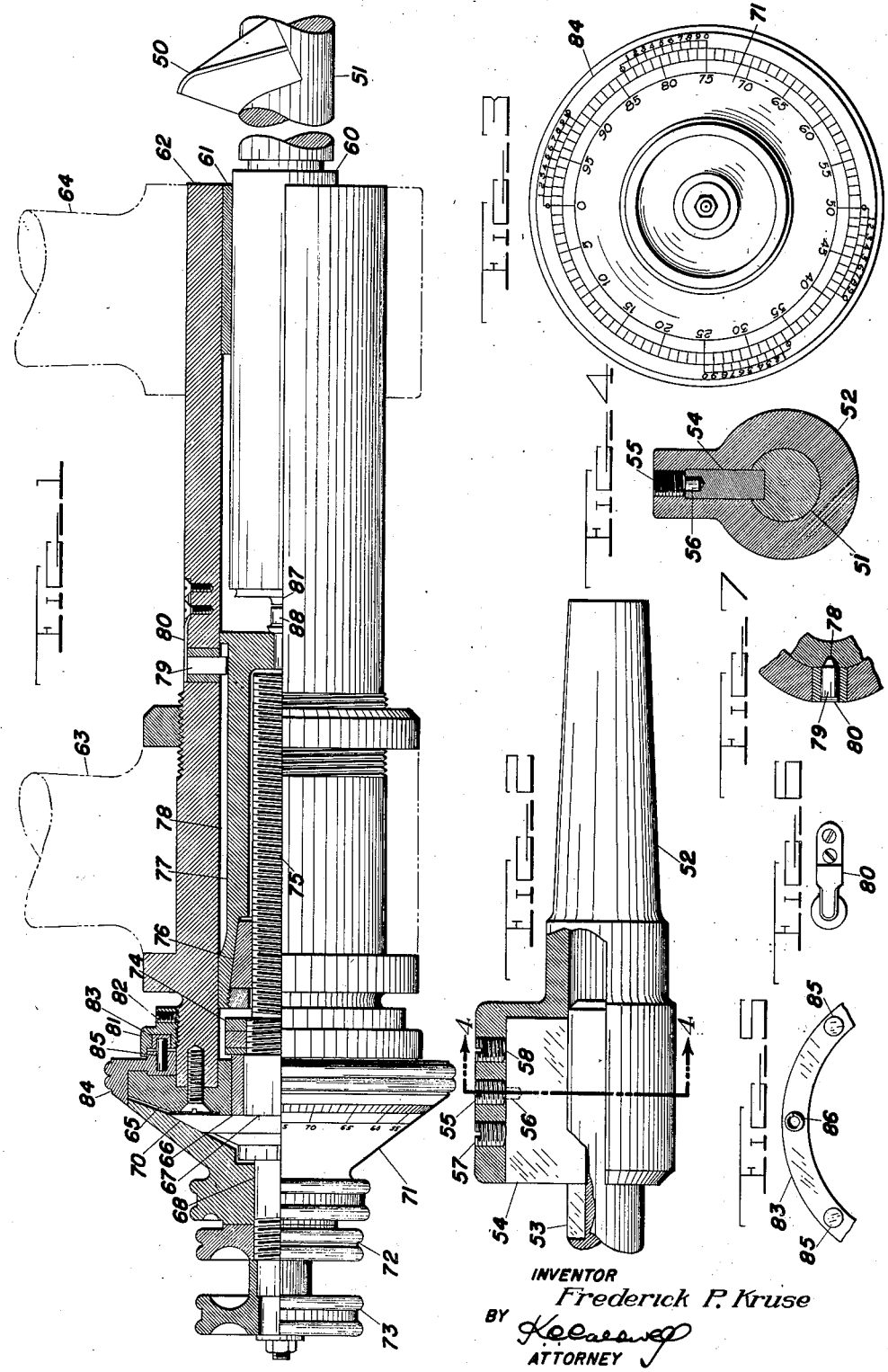
INVENTOR
*Frederick P. Kruse*
BY
ATTORNEY Patented Aug. 25, 1942

2,293,745

UNITED STATES PATENT OFFICE 2,293,745

MICROMETER MEANS FOR POSITIONING MACHINE ELEMENTS

Frederick P. Kruse, Vallejo, Calif.

Original application October 31, 1938, Serial No. 237,977. Divided and this application May 23, 1941, Serial No. 394,754

4 Claims. (Cl. 33—164)

(Granted under the act of March 3, 1883, as amended April 30, 1928; 370 O. G. 757)

This invention relates to a micrometer means for accurately positioning a machine element and more particularly to the application of such a device to the shifting or adjusting of the cutter-bar of a universal milling machine in an axial direction. This application is a division of my co-pending application, Serial No. 237,977, filed October 31, 1938, for Worm gear cutting, now Patent No. 2,273,050, dated February 17, 1942. In that application there was disclosed a method of cutting worm gears by means of a single tooth fly cutter in a universal milling machine. In following that method it becomes necessary to axially shift the cutter-bar of the milling machine a plurality of times during the cutting of each gear wheel. These shifts require the axial movement of the cutter-bar through short distances, with very accurate positioning of the cutter at the conclusion of each shift. The present invention provides a convenient and accurate means for accomplishing this result. It eliminates possibilities for errors which existed in prior devices of this type.

It is an object of this invention to provide a micrometer adjusting means which will preclude the possibility of adding the value of a previously made shift to one being made, where a succession of such shifts is required.

It is another object of this invention to provide such an adjusting means carrying a plurality of vernier scales, any one of which may be manually moved to any desired point with reference to the main micrometer scale without changing the setting of the micrometer.

Other objects will appear from consideration of the following description and accompanying drawing, in which:

Fig. 1 is an elevational view partly in section of a micrometer positioning device embodying the invention;

Fig. 2 is an extension of the view shown in Fig. 1 showing the means for securing the right hand end of the cutter-bar shown therein;

Fig. 3 is an elevational view of the left hand portion of the micrometer positioning device as shown in Fig. 1;

Fig. 4 is a sectional view of the mechanism shown in Fig. 2 taken on line 4—4 thereof, and Figs. 5, 6 and 7 are views of fragments of the mechanism shown in Fig. 1.

The fly-cutter 50, as shown in Fig. 1, is carried by cutter-bar 51 of a universal milling machine. The cutter-bar is supported at one end by a sleeve 52 which in turn is connected to the spindle through a conventional spindle drive head. This end of the cutter-bar is provided with a longitudinal slot 53. The end of the sleeve into which the cutter-bar fits is enlarged and is provided with a key 54 having a sliding fit in the slot 53. The enlarged portion of the sleeve is provided with three tapped holes in which are screwed three screws having the function of locking the end of the cutter-bar to the sleeve. The center screw 55 ends in a pin 56 which penetrates a hole in the key and serves to accurately locate it. The other screws 57 and 58 apply pressure behind the key to securely lock it in place in the slot 53.

The other end of the cutter-bar 51 is securely fastened in a sleeve 60 which turns with it. The sleeve 60 rotates in bearing 61 forming a part of an outer sleeve 62, the latter being supported in a fixed manner by the milling machine overarm supports 63 and 64.

At the free end of outer sleeve 62 is secured by screws a disk 65. This disk is provided with a centrally located aperture carrying a bearing bushing 66 in which is rotatably carried a spindle 67. The spindle has an outer reduced cylindrical section 68, and joining that section to the portion revolving in bearing bushing 66 is a collar formed with an outer conical face 70 acting as a seat for a graduated dial 71, which is held in place on the section 68 and against seat 70 by a knurled nut 72. Keyed on the outer extremity of section 68 of the spindle is a knurled knob 73. Turning this knob moves the graduated dial. The spindle is held against outward axial movement by means of a nut 74 abutting the inner end of bearing bushing 66. The inner end 75 of spindle 67 is threaded and engages with a nut 76 secured to a sleeve 77 which is slidably mounted in the bore of outer sleeve 62. The sleeve 77 is provided with a longitudinally extending keyway 78 into which is slidably but accurately fitted and held a taper ended pin 79 shown in detail in Figs. 6 and 7. The sides of the keyway are inclined at the same angle as the tapered end of the pin. The pin is pressed into position by a leaf spring 80 which is secured at one end to outer sleeve 62. Use of the tapered pin prevents play between key and keyway, due to wear.

On the outer end of outer sleeve 62 is threaded a collar 81 normally held immovable by setscrew 82. On the outer face of the collar is an annular groove in which is seated a friction ring 83. Floating on the end of outer sleeve 62 and abutting the inner face of disk 65 is a vernier ring 84. The circumferential part of this ring is flanged with a portion that encloses the periphery of the disk and is formed with an outer conical face which forms a continuation of the conical face of the graduated dial. The conical ring face has inscribed thereon four vernier scales arranged as shown in Fig. 3. The friction ring 83 is provided with eight equally spaced holes and the vernier ring 84 is provided with an equal number of matching holes. In the corresponding holes are alternatively placed dowels 85 and springs 86. The dowels slide freely in the vernier ring and the springs serve to keep said ring lying snugly against the disk 65. The friction ring holds the vernier ring against accidental rotation but allows manual rotation thereof. The adjacent ends of sleeves 60 and 77 are provided with anvils 87 and 88 respectively, having hardened lapped faces. These anvils serve as an accurate reference means for measuring by means of the graduated dial the position of the cutter-bar and its cutter.

The manner of using the micrometer axial shifting device is as follows: Suppose that the desired shift of the cutter is to be to the right with respect to the device, as illustrated in Fig. 1. The cutter-bar is held in a fixed longitudinal position by sleeve 52 and is also rotated thereby. The other end of the cutter-bar is supported but not longitudinally held by bearing 61. The anvils 87 and 88 are in contact and the zero mark on the graduated dial is coincident with the zero mark on any selected one of the vernier scales. To shift the bar, the pressure on key 54 is released to free that end of the cutter-bar for movement. The cutter-bar is then moved to the new setting by turning knob 73, and the key 54 is again forced into place. The vernier ring is then manually turned until any zero mark on it coincides with the zero mark of the graduated dial, and again secured in place. The graduated dial is now turned in the opposite direction from that used for shifting the bar, until the anvils 87 and 88 are no longer touching. The first step in any subsequent shift will be to turn the graduated dial until the anvils 87 and 88 return to contact and the zero mark on the dial coincides with a zero mark on the vernier ring. The design and method of using the vernier ring precludes confusion and errors incident to adding the value of one axial shift to successive axial shifts.

While the disclosure has been restricted to a particular embodiment of the invention relating to the axial positioning of the cutter-bar of a universal milling machine, it is apparent that its field of use extends to the accurate positioning of many other types of machine elements. Many changes in proportions and arrangements of the various parts of the device are also possible within the scope of the invention as defined by the appended claims.

The invention described herein may be manufactured and/or used by or for the Government of the United States of America for governmental purposes without the payment of any royalties thereon or therefor.

I claim:

1. A micrometer axial shifting device for a horizontal cutter-bar of a milling machine, comprising; a sleeve member supporting one end of the cutter-bar against axial movement, means for releasing said one end of said cutter-bar at will for axial movement, a second sleeve supporting the other end of said cutter-bar but allowing free rotational and axial movement thereof, and micrometer means for moving said cutter-bar in an axial direction, said means comprising a spindle carried by said second sleeve and held against axial movement, said spindle being threaded over a portion of its length, a sleeve member engaging said threads and longitudinally movable upon rotation of said spindle to move said cutter-bar in an axial direction, a graduated dial fixed to said spindle, means to manually rotate said spindle, an annular member having a face forming a continuation of said graduated dial, a plurality of vernier scales upon said face, and means fixed with respect to said second sleeve and frictionally engaging said annular member in a manner to hold it against axial movement with respect to said second sleeve, said frictional engagement being so regulated as to allow manual rotation of said member but to prevent accidental rotational movement thereof.

2. A micrometer device for accurately positioning a machine element comprising; a support, an outer sleeve immovably carried by said support, a spindle rotatably mounted in said sleeve but held from longitudinal movement with respect thereto, said spindle being threaded over a portion of its length, a graduated dial fixed to said spindle, means to manually rotate said spindle, an inner sleeve having an internally threaded portion meshing with the threads on said spindle, means preventing rotational movement of said inner sleeve, said inner sleeve having a portion abutting the machine element for movement of the latter, an annular member mounted upon said outer sleeve and having a face forming a continuation of said graduated dial, a plurality of vernier scales upon said face, and means fixed with respect to said outer sleeve and frictionally engaging said annular member in a manner to hold it against axial movement with respect to said outer sleeve, said frictional engagement being so regulated as to allow manual rotation of said member but to prevent accidental rotational movement thereof.

3. A micrometer device for axially positioning a machine element, comprising; a support, an outer sleeve immovably carried by said support, a spindle rotatably mounted in said sleeve but held from longitudinal movement with respect thereto, said spindle being threaded over a portion of its length, a graduated dial fixed to said spindle, means to manually rotate said spindle, an inner sleeve having an internally threaded portion meshing with the threads of said spindle, a longitudinally extending keyway formed in the periphery of said inner sleeve, said keyway having inwardly converging sidewalls, a taper ended pin slidably mounted in said outer sleeve, the tapered end of said pin forming a wedging fit with said keyway, a spring pressing said pin into said keyway, an annular member mounted upon said outer sleeve and having a face forming a continuation of said graduated dial, a plurality of vernier scales upon said face, and means fixed with respect to said outer sleeve and frictionally engaging said annular member in a manner to hold it against axial movement with respect to said outer sleeve, said frictional engagement being so regulated as to allow manual rotation of said member but to prevent accidental rotational movement thereof.

4. A micrometer device for linearly positioning a machine element comprising a support; driving means held by said support in a manner to permit rotational movement but to prevent axial movement thereof; means driven by rotational movement of said driving means to linearly position said machine element, said driving means having a portion formed with a circular boundary concentric with the axis of rotation of said driving means, a scale formed along said circular boundary, a member having a circular boundary juxtaposed to and concentric with the circular boundary of said driving means, a plurality of reference points formed on said member adjacent said circular boundary, means holding said member against movement with respect to said support in the axial direction of said driving means and frictionally engaging said member in a manner to prevent free rotation thereof while permitting forceful manual rotation thereof.

FREDERICK P. KRUSE.